April 24, 1945.  E. F. ANDREWS  2,374,522
TRAP
Filed Dec. 15, 1943
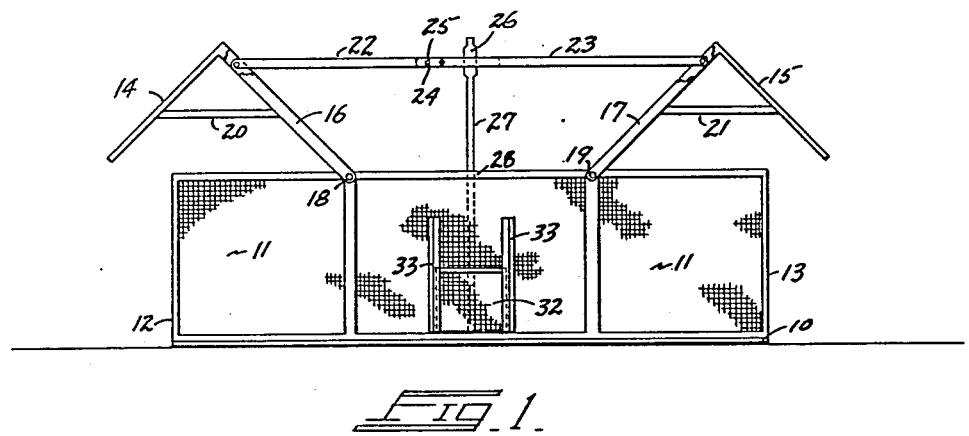
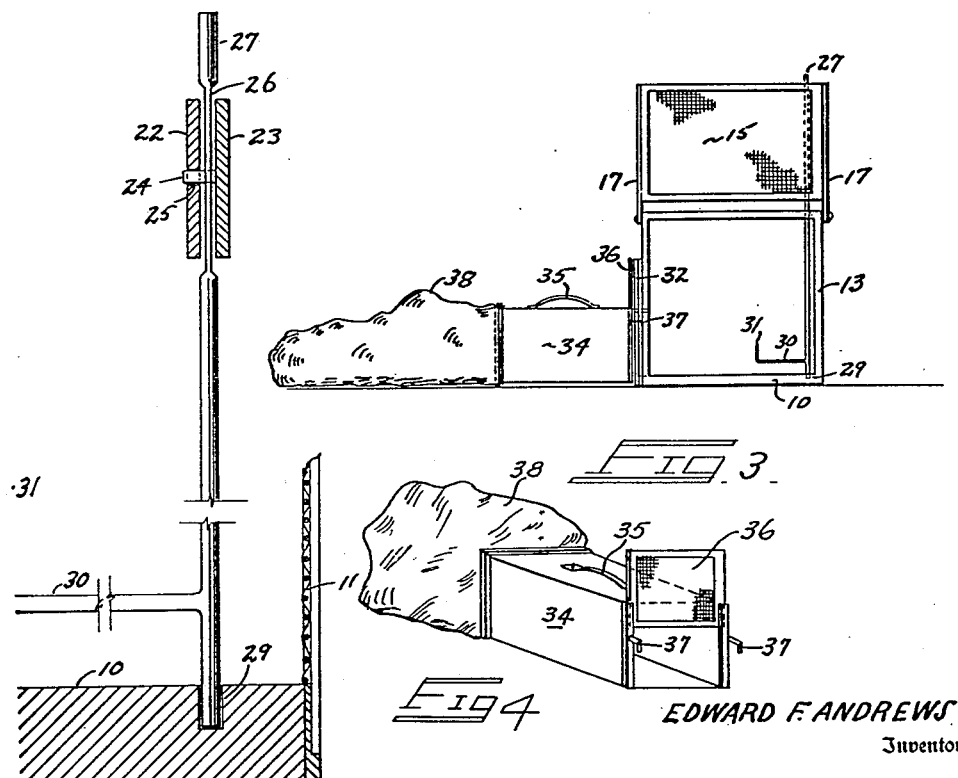
EDWARD F. ANDREWS
Inventor Patented Apr. 24, 1945

2,374,522

UNITED STATES PATENT OFFICE 2,374,522

TRAP

Edward F. Andrews, Youngstown, Ohio

Application December 15, 1943, Serial No. 514,580

6 Claims. (Cl. 43—61)

This invention relates to a trap and more particularly to a trap for catching small animals such as rats, mice, etc.

The principal object of the invention is the provision of a trap incorporating a sensitive trigger assembly of simple construction.

A further object of the invention is the provision of a trap provided with means for conveniently removing animals trapped therein.

A still further object of the invention is the provision of a trap formed with normally opened ends provided with elevated doors, which doors are simultaneously released by a single trigger member and adapted to close the open ends of the trap.

The trap disclosed herein has been designed primarily for catching rats which, as is known, cause considerable damage in various commercial properties. The trap of the invention is, therefore, particularly adapted for use in commercial properties where it may be examined once a day and is so designed that animals caught during the interval preceding inspection may be removed in a removable section of the trap conveniently and easily and disposed of by killing while in the removable portion of the trap. It has been determined that when a common cage type trap as heretofore known in the art is used for catching rats, the rats apparently sense the purpose of the trap, particularly when the trap is used for drowning the captured animal. It has further been determined that rats dislike to enter any area from which an escape is not apparently readily available.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawing, wherein:

Figure 1 is a side elevation of the trap showing the doors in open position.

Figure 2 is an enlarged detail of the sensitive trigger member incorporated in the trap illustrated in Figure 1.

Figure 3 is an end elevation of the trap shown in Figure 1 showing the temporary attachment thereto of the removable portion thereof provided for the removal of the animals trapped thereby.

Figure 4 is a perspective elevation of the removable portion of the trap shown in Figure 3.

By referring to the drawing and Figure 1 in particular, it will be seen that the trap proper consists of a base preferably formed of wood and indicated by the numeral 10 upon which a rectangular enclosure 11 has been formed preferably of wire mesh or expanded metal, the ends 12 and 13 being provided with frame formations as indicated and otherwise left open. A pair of double door assemblies are provided and are indicated by the numerals 14 and 15 and may consist of solid pieces of material or sections of wire mesh on appropriate frames or pieces of expanded metal as desired. These doors 14 and 15 are affixed at their uppermost edges to frame members 16 and 17, respectively, which in turn are pivoted at their opposite ends by pivots 18 and 19 to portions of the rectangular trap structure inwardly from the outer ends thereof. Base members 20 and 21, respectively, insure the positioning of the doors 14 and 15 with respect to the frame members 16 and 17. It will be observed that the frame members 16 and 17 are duplicated at each side of the trap as well as at each end thereof. In order that the doors 14 and 15 together with their frames 16 and 17 may be held in elevated relation to the trap structure 11 and thereby provide an open passageway completely through the trap, trigger bars 22 and 23, respectively, are pivoted to the frames 16 and 17 and extends inwardly from its pivot point and overlaps the other pivot bar a considerable distance. One of the pivot bars, that indicated by the numeral 23 is provided with one or more pins 24 on the side thereof, which pins 24 are adapted to engage appropriately sized openings 25 formed in the other pivoted bar 22. The pins 24 are long enough so that a flattened section 26 of a vertically positioned trigger member 27 may be positioned between the trigger bars 22 and 23 before the pins 24 are engaged in the openings 25 in the trigger bar 22. The trigger member 27, as is best illustrated in Figure 2, is preferably positioned at one side of the trap structure and is preferably formed of a section of round stock flattened at one point to provide the thin, flat portion 26 which is adapted to be positioned between the trigger bars as heretofore described.

It will thus be seen that any rotation of the trigger member 27 will cause the thin, flat portion 26 of the trigger member 27 to revolve and push the rigger bars 22 and 23 apart as the pins 24 disengage from the openings 25. When this occurs the resulting action will be the immediate dropping of the doors 14 and 15, which action may be assisted by spring means if desired. In actual practice it has been determined that the weight of the doors 14 and 15 and the frame structure 16 and 17 will cause sufficiently rapid closing action. The trigger member 27 is positioned through an opening 28 in the frame structure of the trap 11 and the lowermost end thereof is positioned in an appropriately shaped opening or socket 29 in the wooden floor 10 of the trap. A horizontally positioned arm 30 is attached to or formed on the trigger member 27 near the lowermost portion thereof and extends outwardly a few inches and is provided with an upturned point 31 upon which the bait is adapted to be firmly positioned.

It will thus be seen that in set position, as illustrated in Figure 1, the doors are in elevated position and bait is positioned on the prongs 31 which form portions of the trigger member 27. In this position it will be observed that a rat approaching the trap can see a clear passageway completely through the trap and further can see the bait as it is in approximately the center of the trap supported above the floor by the arm 30. Upon the animal's entering the trap and attempting to take the bait, the trigger member 27 rotates causing the operation of the trigger bars 22 and 23 and the immediate closing of the doors 14 and 15. In order that the animals may be conveniently removed from the trap without disturbing the trap itself or using it for drowning the animals as is common, a side door 32 is provided and is positioned over an opening inside the trap 11 and held in position by suitably, vertically positioned guides 33. The door 32 is capable of vertical movement in the guides 33.

By referring to Figure 3 it will be seen that a detachable portion of the trap consisting of a small box-like structure 34 provided with a handle 35 and a vertically sliding door 36 is attached to the side of the trap 11 by means of hooks 37 and the doors 36 and 32 are held in open position manually when animals are removed from the trapping section of the trap. The relatively small box-like structure 34 is open at both ends and the opposite end is provided with an attached sack 38. It has been determined that the trapped animals immediately seek safety in the darkness of the interior of the sack leaving the trap by way of the small box-like structure 34 which has been attached temporarily over the doorway normally closed by the door 32. When this occurs the doors 36 and 32 on the detachable portion 34 of the trap and the trap proper 11 may be closed and the animals disposed of by killing them in the sack in which they have sought refuge. Thus, there is no contamination of the trap itself in the killing of the trapped animals and no odors are left which would serve to warn other animals when the trap is again set. The resetting of the trap is readily accomplished by lifting the doors 14 and 15 and turning the trigger member 27 so that the trigger bars 22 and 23 may be engaged as heretofore described with the section 26 of the trigger member therebetween. The trap is then ready for subsequent operation.

It will thus be seen that a relatively simple and extremely efficient trap has been disclosed which can be economically produced and which will, due to the provision for the disposal of the animals caught therein, continue to be of value as a trap over an unlimited time.

Having thus described my invention, what I claim is:

1. In a trap consisting of an enclosure of suitable material and provided with open ends, door structures pivotally affixed to the said enclosure and adapted to close the said ends when lowered, means for holding the said door structures in elevated relation to the said enclosure, said means comprising a pair of bars each attached at its outermost end to a corresponding door structure and adapted to be separably attached to each other at their innermost ends, and trigger means in said enclosure for separating the said bars from one another so as to permit the door structures to close.

2. In a trap consisting of an enclosure of suitable material and provided with open ends, door structures pivotally affixed to the said enclosure and adapted to close the said ends when lowered, means for holding the said door structures in elevated relation to the said enclosure, said means comprising a pair of bars each attached at its outermost end to a corresponding door structure and adapted to be separably attached to each other at their innermost ends, trigger means in said enclosure for separating the said bars from one another so as to permit the door structures to close, and means for removing animals trapped in the said enclosure, said means including a normally closed doorway in the said enclosure structure and a detachable secondary trap structure provided with a normally closed doorway and adapted to be positioned adjacent the said doorway in the said enclosure.

3. In a trap consisting of an enclosure of suitable material and provided with open ends, door structures pivotally affixed to the said enclosure and adapted to close the said ends when lowered, means for holding the said door structures in elevated relation to the said enclosure, said means comprising a pair of bars each attached at its outermost end to a corresponding door structure and adapted to be separably attached to each other at their innermost ends, trigger means in said enclosure for separating the said bars from one another so as to permit the door structures to close, and means for removing animals trapped in the said enclosure, said means including a normally closed doorway in the said enclosure and a detachable secondary trap structure provided with a normally closed doorway and adapted to be positioned adjacent the said doorway in the said enclosure, the said secondary trap including a sack-like structure.

4. A trap consisting of a box-like structure having open ends, an opening formed in one side of the said structure and a normally closed door affixed to the said opening, a detachable secondary trap structure adapted to be attached to the said trap over the said side door, a door formed on the said secondary trap structure and a sack attached thereto, door structures pivoted to the said box-like structure inwardly from the outer ends thereof and adapted to close the open ends thereof when lowered, the said door structures being held in elevated position when the trap is set by means of bars pivoted to the door structures at their outermost ends and one of the bars having means secured thereto for engaging the other, and a trigger member positioned in the said box-like structure to which bait may be affixed, said trigger member having a flattened section adjacent the uppermost end thereof and between the said bars and adapted to disengage the same upon movement of the bait holding portion thereof as by an animal taking the bait.

5. In a trap structure including doors, a movably positioned vertical rod, a prong formed adjacent the lowermost end of the said rod for the attachment of bait thereto, said rod having a flat section near the upper end thereof, the said flat section being normally positioned longitudinally of the said trap structure, and bars releasably affixed to one another and normally supporting said doors, said bars being positioned one on each side of said rod adjacent said flat section thereof, so as to be disengaged by the movement of the said rod to permit the said doors to close.

6. A trap consisting of two enclosures, one comprising a trapping section consisting of a box-like section having open ends and normally elevated doors held by trigger means to which bait may be attached, and a door formed in one side of the trapping section, the secondary enclosure adapted to be attached to the said trapping section, said secondary enclosure including a sack for receiving animals trapped in the trapping enclosure and providing a convenient means for disposing of the trapped animals.

EDWARD F. ANDREWS.